United States Patent [19]

Kimura

[11] 4,357,084

[45] Nov. 2, 1982

[54] EXPOSURE CONTROL DEVICE FOR CAMERAS
[75] Inventor: Kazuo Kimura, Sakai, Japan
[73] Assignee: Minolta Camera Kabushiki Kaisha, Osaka, Japan
[21] Appl. No.: 271,020
[22] Filed: Jun. 5, 1981
[30] Foreign Application Priority Data
   Jun. 9, 1980 [JP] Japan .................................. 55-78044
[51] Int. Cl.³ ........................................... G03B 7/083
[52] U.S. Cl. ........................................ 354/24; 354/51
[58] Field of Search ............................. 354/24, 50, 51
[56] References Cited
   U.S. PATENT DOCUMENTS
   4,072,961  2/1978  Yamada ........................... 354/51 X

*Primary Examiner*—Michael L. Gellner
*Attorney, Agent, or Firm*—Watson, Cole, Grindle & Watson

[57] ABSTRACT

In an exposure control device for a camera wherein exposure is controlled in accordance with the scene object light reflected from the surfaces of a leading shutter curtain and a film, the error in exposure control due to the difference in reflecting power between the surfaces of the film and the leading shutter curtain is corrected on the basis of an integral value of the difference between the output of the light measuring circuit and the output of a delay circuit which delays the output of said light measuring circuit by a predetermined period of time.

7 Claims, 13 Drawing Figures

EXPOSURE CONTROL DEVICE FOR CAMERAS

BACKGROUND OF THE INVENTION

1. Field of the Invention

The present invention relates to camera exposure control devices capable of measuring light reflected from the surfaces of a leading shutter curtain and a film for exposure control based on the light measurement, and more particularly to such exposure control devices which provide correction of the exposure control to account for the differences in reflectivity between the surface of the leading shutter curtain and the film surface.

2. Description of the Prior Art

With some prior art exposure control devices of the above described type, the surface of the leading shutter curtain (facing an objective) is adapted to have a given reflecting power with the assumption that reflecting powers of the surfaces (the emulsion surfaces) of films are common and identical to the given reflecting power regardless of the types of the films. In fact, however, the surfaces of different type films have different reflecting powers and even the surfaces of the same type films may represent different reflecting powers. Thus, even if the scene brightness and the aperture size of an objective remains unchanged for each light measurement, the intensity of the scene light incident on a light receiving element after having been reflected from the surface of the film will become different in accordance with the film in use, resulting in different light measurement.

With the prior art exposure control device of this type, therefore, when the reflecting power of the surface of the film is actually higher than that of the surface of the leading shutter curtain under conditions of the same scene brightness and aperture size, the intensity of the scene light incident on the light receiving element increases after the start of travel of the leading shutter curtain, whereby the shutter is controlled at an exposure time shorter than the correct exposure time, resulting in an underexposure. In contrast thereto, when the reflecting power of the surface of the film is lower than that of the surface of the leading shutter curtain, the intensity of the scene light incident on the light receiving element decreases after the start of travel of the leading shutter curtain travel, whereby the shutter is controlled at an exposure time longer than the correct exposure time, resulting in an overexposure.

To solve the above problem, there have been proposed exposure control devices which, besides the light receiving element capable of measuring light, reflected from the surfaces of a leading shutter curtain and a film, for exposure control, include a second light receiving element arranged for detecting the difference in reflecting power between the surfaces of the leading shutter curtain and the film to thereby correct any exposure error in accordance with the difference thus detected.

However, the exposure control devices of this type have the disadvantages of an increase in the number of components and the cost of manufacturing because they additionally and necessarily require not only the second light receiving element but also lead wires connected to the second light receiving element and a condenser lens disposed in front of the second light receiving element.

SUMMARY OF THE INVENTION

Accordingly, it is an object of the present invention to provide an improved camera exposure control device of the above described type which is capable of detecting the difference in reflecting power between the surfaces of a leading shutter curtain and a film and which ensures a correct exposure at all times.

It is a further object of the present invention to provide an improved camera exposure control device of the type specified herein to provide correction for differences in reflecting powers between the surfaces of films and the reflecting surface of the leading shutter curtain to enable correct exposure with film surfaces having different reflecting powers and with different reflecting powers between the film surface itself and the leading shutter curtain surface.

It is yet a further object of the invention to provide correction of different reflecting powers between the reflecting surfaces of a film and a leading shutter curtain by relatively inexpensive and easily assembled electronic components in a camera of the type specified herein.

Yet another object of the invention is to provide correction for the difference in reflecting powers between a film surface and a leading shutter curtain surface adaptable for both spot light and average light measurement from an object in a single lens reflex camera.

To accomplish the above objects, a camera exposure control device of the present invention includes a light measuring circuit which has a light receiving element capable of measuring light reflected from the surfaces of a leading shutter curtain and a film; a first integrating circuit which integrates an output of the light measuring circuit in terms of time; a comparator which compares the integrated output from the integrating circuit with a corrected reference signal from a reference signal generating means; and shutter closing electromagnetic means responsive to a signal generated by the comparator when the integrated output represents a given relationship relative to the corrected reference signal. The reference signal generating means includes a constant voltage source which generates a reference voltage dependent on the set film speed; a delay circuit which generates a delayed output corresponding to the output from the light measuring circuit delayed for a given period of time; a subtracting circuit which calculates the difference between the delayed output and the output from the light measuring circuit; a second integrating circuit which integrates the calculated difference in terms of time; and an adding circuit which calculates the sum of the integrated output from the second integrated circuit and the reference voltage from the constant voltage source. The corrected reference signal is generated from the adding circuit as an output thereof to be fed to the comparator. Thus, the corrected reference signal is corrected from the reference voltage of the constant voltage source by the integrated output from the second integrating circuit.

Alternatively, a camera exposure control device of the present invention may have a circuit arrangement wherein the correction is made to the integrated output from the first integrating circuit but not to the reference voltage from the constant voltage source.

BRIEF DESCRIPTION OF THE DRAWINGS

The above and other objects and advantages of the present invention will become more apparent from the following description of preferred embodiments representing the best mode of carrying out the invention when taken in conjunction with the accompanying drawings, wherein.

DETAILED DESCRIPTION OF THE PREFERRED EMBODIMENTS

With reference to FIGS. 1 through 5, the following description pertains to the errors occurring when the reflecting power of a film surface is different from that of a leading shutter curtain surface.

Figure 1:
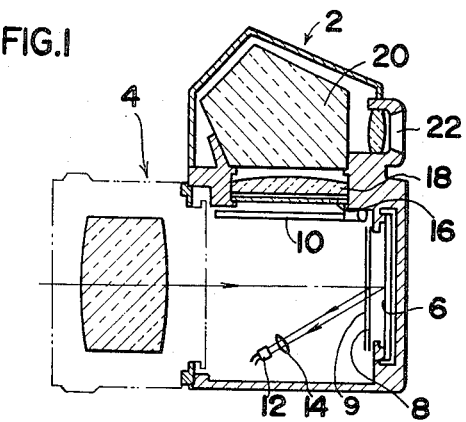
FIG. 1 is a cross-sectional view of a camera incorporating an exposure control device of the present invention.

In FIG. 1 movable reflecting mirror 10 is shown in the picture taking position, and scene light passing through an objective lens of an exchangeable lens 4 mounted on camera body 2 is incident on film surface 6 for exposure. Photodiode 12 is located on the floor of a mirror box (not shown), and condenser lens 14 is disposed in front of photodiode 12 for concentrating light rays reflected from the surfaces of leading shutter curtain 8 and film 6 in the vicinity of the center of an exposure aperture of photodiode 12. It should be noted that, with movable reflecting mirror 10 lowered to an angle at 45° relative to the horizontal plane, the scene light having passed through the objective lens is reflected upwards by movable reflecting mirror 10 to form an image on focusing plate 16, the image being observed from eyepiece 22 through condenser lens 18 and pentagonal roof prism 20 in a manner known to those skilled in the camera art.

Figure 2:
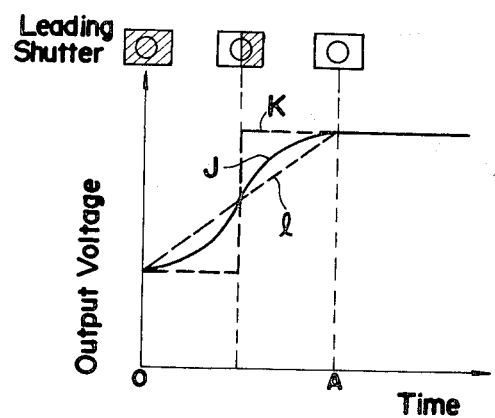
FIG. 2 is a diagram showing the output variation of a light receiving element when the reflecting power of the surface of a film is higher than that of the surface of a leading shutter curtain.

FIG. 2 is a diagram showing the output of photodiode 12 during a period from time O, at which leading shutter curtain 8 of a shutter starts traveling, to time A at which the leading shutter curtain completes traveling, when the reflecting power of film surface 6 is higher than that of leading shutter curtain surface 8. The ordinate represents the output of photodiode 12, and the abscissa represents time. With a center-weighted light measuring system, as in the embodiments of the present invention, immediately after the commencement of travel of the leading shutter curtain, photodiode 12 receives, for the most part, light reflected by the leading shutter curtain surface. Therefore, output j of photodiode 12 depends on the reflecting power of leading shutter curtain surface 8. When the leading shutter curtain thereafter travels to the vicinity of the center of the exposure aperture, photodiode 12 gradually receives the light reflected from film surface 6 more than that from the leading shutter curtain surface 8, thereby causing output j of photodiode 12 to gradually increase. When the leading shutter curtain travels further to reach the end of the exposure aperture, photodiode 12 receives only the light reflected from film surface 6, whereby output j of photodiode 12 depends on the reflecting power of film surface 6, representing a constant value which is higher than that immediately after the start of travel of the leading shutter curtain.

With a center-spot light measuring system, the output of photodiode 12 suddenly changes, as indicated by broken line k, immediately after leading shutter curtain 8 has passed through the center of the exposure aperture. Moreover, with an averaged light measuring system, the output of photodiode 12 varies, as shown by broken line l, in proportion to the ratio of the area in the exposure aperture occupied by the uncovered film 6 to that occupied by leading shutter curtain 8.

Figure 3:
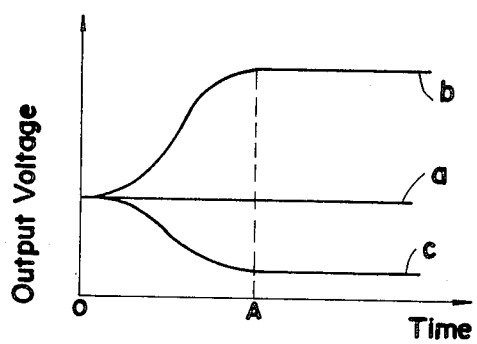
FIG. 3 is a diagram showing the output variations of a light receiving element when the reflecting power of the surface of a film is higher and lower than that of the surface of a leading shutter, respectively.

FIG. 3 is a diagram showing the output variation of photodiode 12 during a period from time O, at which the leading shutter curtain starts traveling, to time A at which the leading shutter completes traveling. The ordinate represents the output of photodiode 12 and the abscissa represents time. Line a shows the output when the reflecting power of a film surface is equal to that of the leading shutter curtain surface. As shown, the output of photodiode 12 remains unchanged after the leading shutter curtain has started traveling. Line b, corresponding to line j of FIG. 2, shows the output variation of photodiode 12 when the reflecting power of a film surface is higher than that of the leading shutter curtain surface. The output level becomes higher than that shown by line a after the start of the leading shutter curtain travel, and reaches a constant value which is determined only by the reflecting power of the surface of a film after time A at which time the leading shutter curtain completes traveling. Line c shows the output variation of photodiode 12 when the reflecting power of the film surface is lower than that of the leading shutter curtain surface. The output level becomes lower than that shown by line a after the start of the leading shutter curtain travel, and similar to line b, reaches a constant value which is determined only by the reflecting power of the film surface after time A at which the leading shutter curtain completes traveling.

Figure 4:
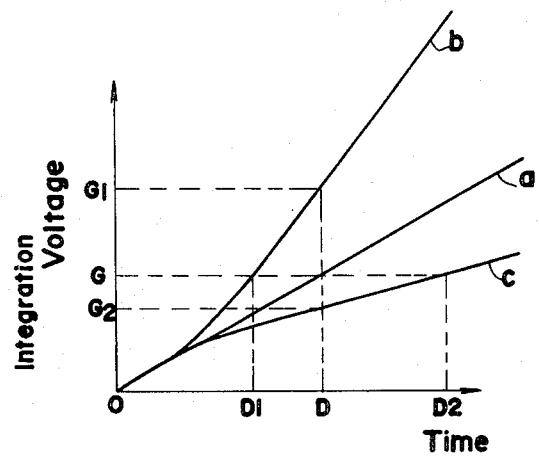
FIG. 4 is a diagram showing the integrated values obtained by integrating the outputs of the light receiving element of FIG. 3 in terms of time.

FIG. 4 shows the condition when the output of the photodiode of FIG. 3 is integrated in terms of time, wherein the ordinate represents the integrated value and the abscissa represents time. Lines a, b and c correspond respectively to outputs a, b and c of FIG. 3. In the case of line a (showing that the reflecting power of the film surface is equal to that of the leading shutter curtain surface), the integrated value increases in proportion to time, with an inclined straight line. Normally, a correct exposure is provided if a trailing shutter curtain is allowed to start traveling at time D when the integrated value reaches a reference value determined by a set film speed, e.g. the value G in the diagram.

However, when the reflecting power of the film surface is higher than that of the shutter curtain surface, the integrated value increases to a higher value than that indicated by line a, with an upward concave line (as shown by line b) for a period from the time when the leading shutter curtain starts traveling to the time when the shutter curtain completes traveling. The integrated value rises with a straight line more steeply inclined than line a after the shutter curtain has completed traveling. Accordingly, the integrated value reaches reference value G in time D1 (earlier than time D) to cause a trailing shutter curtain to start traveling, thereby resulting in an underexposure.

In contrast thereto, when the reflecting power of a film surface is lower than that of the leading shutter curtain surface, as shown by line c, the integrated value is less than that of line a, with an upward convex line, for a period from the time when the leading shutter curtain starts traveling to the time when the leading shutter curtain completes traveling, and rises with a straight line less steeply inclined than that indicated by line a after the shutter has completed traveling. As a result, the integrated value reaches reference value G at time D2 (later than time D) to cause a trailing shutter curtain to start traveling, thereby resulting in an overexposure.

Figure 5:
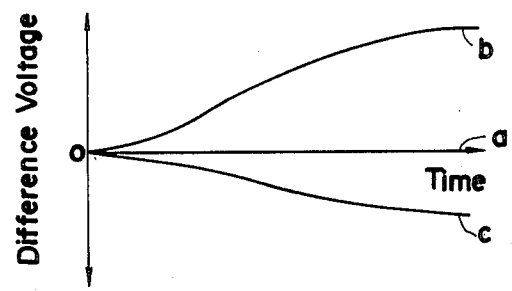
FIG. 5 is a diagram showing the differences in the integrated values indicated by lines b and c, and the integrated value indicated by line a in FIG. 4.

FIG. 5 is a diagram showing the light measurement error, wherein lines b and c represent the value of the difference between the integrated values shown by lines b and c, and that shown by line a of FIG. 4, respectively. As apparent from FIG. 5, the amount of the errors increases with the lapse of time.

Figure 6:
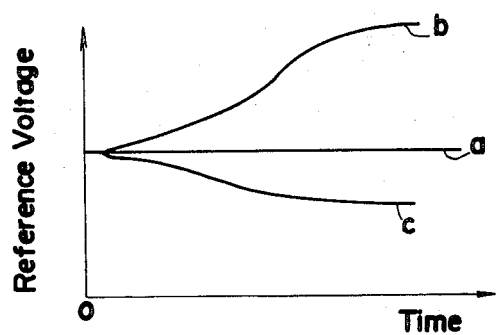
FIG. 6 is a diagram showing the corrected reference values.

According to the present embodiment, therefore, the reference value is corrected to eliminate the exposure error. FIG. 6 shows the corrected reference values, the ordinate representing the reference value, and the abscissa representing time. As indicated by lines b and c in FIG. 6, the corrected reference values are the sum of the reference value a and the amount of the errors shown in FIG. 5. Specifically, according to FIG. 4, the corrected reference voltage for line b is higher than the level at point G, as shown by G1, and that for line c is to be lower than the level at point G, as shown by G2. When these corrected reference voltages are taken into consideration, then correct exposure time will be obtained.

Figure 7:
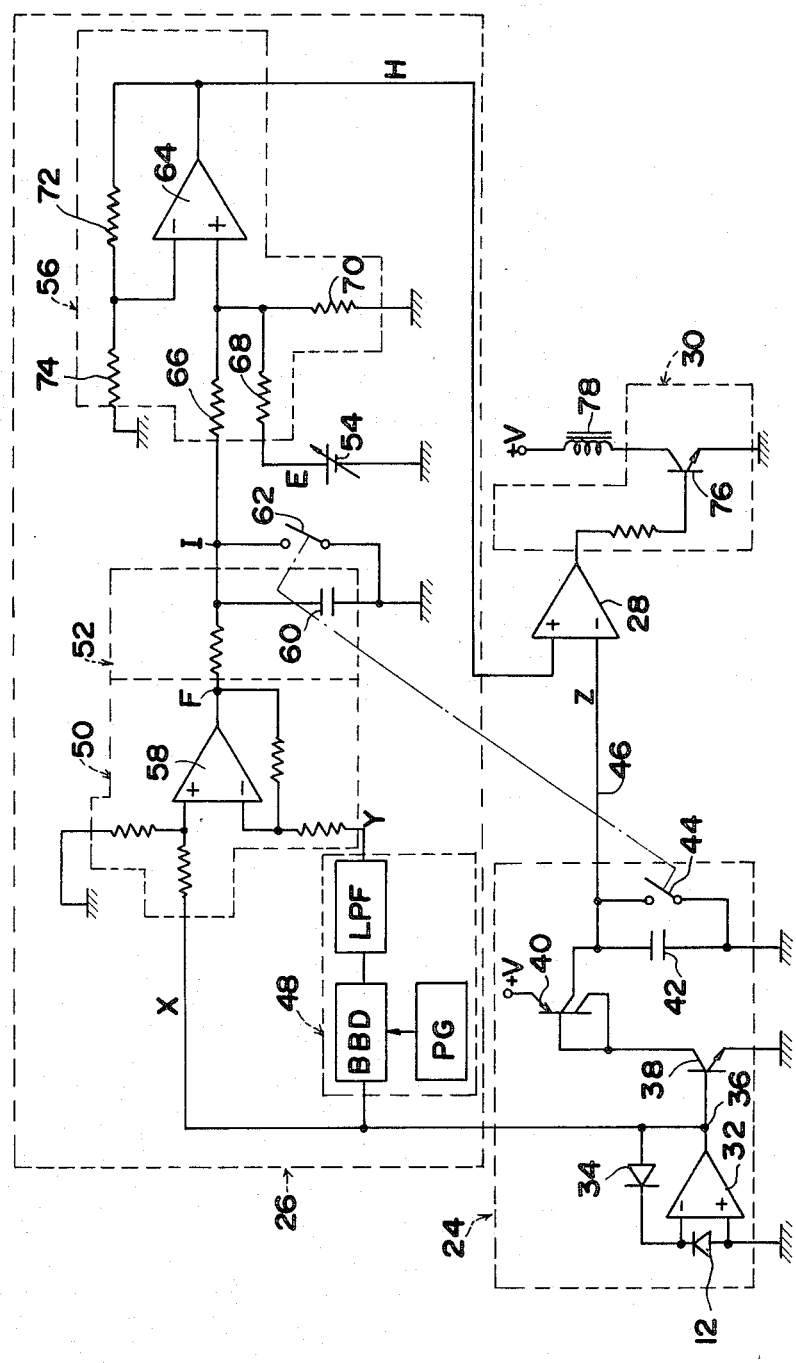
FIG. 7 is a circuit diagram of an exposure control device of the present invention.

FIG. 7 is a circuit diagram of an exposure control device according to a first embodiment of the present invention, wherein light measuring and integrating circuit 24 includes photodiode 12 shown in FIG. 1. Reference voltage circuit 26 includes constant-voltage power circuit 54 and circuits 48, 50, 52 and 56, which are described later. Comparator 28 compares the output voltage of light measuring and integrating circuit 24 with the output voltage of reference voltage circuit 26. Switching circuit 30 de-energizes electromagnet 78 for causing electromagnet 78 to start the traveling of trailing shutter curtain 9 for terminating an exposure when the output voltage of light measuring and integrating circuit 24 reaches the output voltage of reference voltage circuit 26.

Referring now to light measuring and integrating circuit 24, photodiode 12 is connected between the input terminals of operational amplifier 32, and logarithmically compressing diode 34 is connected between the output terminal and the negative input terminal of amplifier 32 to form a negative feedback circuit, whereby output terminal 36 of amplifier 32 generates output voltage X proportional to the logarithm of the output current of photodiode 12.

The base of logarithmic expansion transistor 38 is connected to output terminal 36 of amplifier 32, and the collector thereof is connected through mirror circuit 40 to integrating capacitor 42. Switch 44, connected across the opposite terminals of integrating capacitor 42, is a trigger switch which is closed when the shutter is cocked, and which is opened when the leading shutter curtain starts traveling. When trigger switch 44 is opened, integrating capacitor 42 is charged through transistor 38 and mirror circuit 40 by an electric current corresponding to the logarithmic expansion of output voltage X. Therefore, through the logarithmic compression and expansion and the charging of capacitor 42, light measuring and integrating circuit 24 generates, at its output terminal 46, a voltage corresponding to the integration of the quantity of the scene light which is incident on photodiode 12 after the start of the travel of the leading shutter curtain.

However, output terminal 36 of amplifier 32 in light measuring and integrating circuit 24 is connected to the input terminal of reference voltage circuit 26 so that output voltage X of amplifier 32 is input to reference voltage circuit 26. Reference voltage circuit 26 is composed mainly of delay circuit 48 for delaying output voltage X for a specific period of time; subtracting circuit 50 for obtaining the difference between output voltage X and output voltage Y (which is output voltage X delayed by delay circuit 48); integrating circuit 52 which integrates output F of subtracting circuit, adjustable constant-voltage power circuit 54; and adding circuit 56 which adds output voltage E of adjustable constant-voltage power circuit 54 to the output voltage I of integrating circuit 52.

Delay circuit 48 is provided with bucket brigade device BBD and pulse generator PG which drives bucket brigade device BBD. The number of transfer MOS FET cells for bucket brigade device BBD, and the frequency of clock pulses from pulse generator PG are set so that the delay time, i.e., the period of the delay action of delay circuit 48, corresponds to the time from the start of travel of the leading shutter curtain to the arrival thereof at the center of the exposure aperture, e.g. 1/125 second. The output terminal of bucket brigade device BBD is connected through low-pass filter LPF to the negative input terminal of differential amplifier 58 in subtracting circuit 50. Low-pass filter LPF serves to eliminate high-frequency components included in the output from bucket brigade device BBD, and converts a step-like digital output from BBD into a smoothly curved analog output, whereby output voltage Y of delay circuit 48 becomes a signal which corresponds to output voltage X, but delayed for 1/125 second. The output voltage X is directly applied to the positive input terminal of differential amplifier 58 in subtracting circuit 50.

The output terminal of subtracting circuit 50 is connected to capacitor 60 inside integrating circuit 52. Trigger switch 44 in light measuring and integrating circuit 24 is interlocked with switch 62 connected across capacitor 60. These switches 44 and 62 are closed when the shutter is cocked, and are opened when the leading shutter curtain starts traveling.

Adjustable constant-voltage power circuit 54 generates a voltage corresponding to a set film speed. The positive input terminal of differential amplifier 64 in adding circuit 56 is connected through resistor 66 to capacitor 60, and is connected through resistor 68 to constant-voltage power circuit 54 and further grounded through resistor 70. Moreover, the negative input terminal of differential amplifier 64 is connected through resistor 72 to the output terminal of differential amplifier 64 and is grounded through resistor 74.

As a result, the output terminal of adding circuit 56 generates reference voltage H, which corresponds to the sum of corrected voltage I corresponding to the integrated value of output F from subtracting circuit 50 and output voltage E of adjustable constant-voltage power circuit 54.

Figure 8:
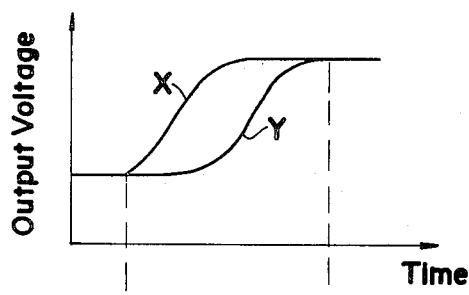
FIG. 8 is a diagram showing the respective outputs of a light measuring circuit and a delay circuit.

The operation of reference voltage circuit 26 is explained with reference to the diagrams of FIGS. 8 through 10, wherein the ordinate represents the output and the abscissa represents time. In the respective diagrams, the reflecting power of the film surface is assumed to be higher than that of the leading shutter curtain surface. As shown in FIG. 8, output voltage X of operational amplifier 32 continues to rise or increase until the leading shutter curtain completes traveling. However, output voltage Y of delay circuit 48 is a signal which corresponds to output voltage X but delayed for 1/125 second. Thus, in the diagram, if output voltage X is shifted to the right along the time axis for 1/125 second, it becomes output voltage Y. It should be understood that both output voltages X and Y should be generated when the leading shutter curtain starts traveling. In order to obtain output voltage Y with this timing, therefore, it is necessary for the light measurement by photodiode 12 to be started at the latest 1/125 second before the start of travel of the leading shutter curtain.

Figure 9:
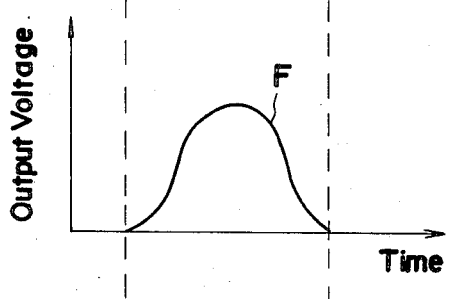
FIG. 9 is a diagram showing the value obtained by subtracting the output of the delay circuit from that of the light measuring circuit.
Figure 10:
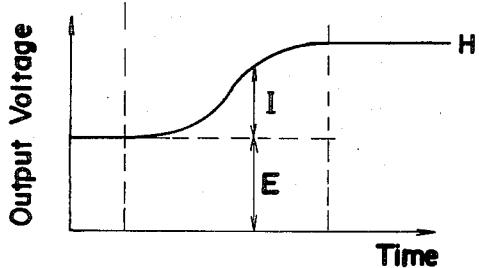
FIG. 10 is a diagram showing the value obtained by integrating the value in FIG. 9 in terms of time.

Output F of subtracting circuit 50 for calculating the difference between output voltages X and Y is illustrated in FIG. 9. Output F is time-integrated by capacitor 60, and output voltage E of adjustable constant-voltage power circuit 54 is added to integrated value I, whereby output voltage H as shown in FIG. 10 is generated. Output voltage H is regarded as the corrected reference voltage. Namely, in FIG. 10, E is a voltage generated by adjustable constant-voltage power circuit 54, and I is a corrected voltage added thereto.

When the reflecting power of the film surface is higher than that of the leading shutter curtain surface, output voltage F attains a high level, causing corrected voltage I to increase. When there is a smaller difference in reflecting power between the two surfaces, output voltage F attains a low level, thereby causing corrected voltage I to decrease. Conversely, when the reflecting power of the film surface is lower than that of the leading shutter curtain surface, the above relationship of output voltages X and Y is inverted, causing both output F and corrected voltage I to be negative values, whereby reference voltage H is corrected to be a value lower than fixed voltage E.

It should be noted that when the delay time provided by delay circuit 48 is too short, the difference between output voltage X and Y becomes too small to obtain corrected voltage I, and that when it is too long, the time from the start of the light measurement by photodiode 12 to the start of the leading shutter curtain travel is required to be long enough to obtain output voltage Y at the time of the start of travel of the leading shutter curtain.

With the exposure control device according to the present embodiment, the output voltage of light measuring and integrating circuit 24 is compared by comparator 28 with the corrected reference voltage H as described above. When the output voltage of light measuring and integrating circuit 24 exceeds reference voltage H, transistor 74 of switching circuit 30 is turned off to de-energize electromagnet 76, whereby trailing shutter curtain 9 starts traveling to terminate an exposure.

As a result, the exposure time is controlled with the reference voltage corrected in accordance with the difference in reflecting power between the surfaces of the film and the leading shutter curtain, thereby providing a correct exposure at all times.

It should be understood that the calculation and comparison method for voltage E, corrected voltage I and output voltage Z of light measuring and integrating circuit 24 may be replaced with another method wherein voltage E alone is applied to one input terminal of comparator 28, and a voltage obtained by subtracting corrected voltage I from output voltage Z is applied to the other input terminal of comparator 28.

Figure 11:
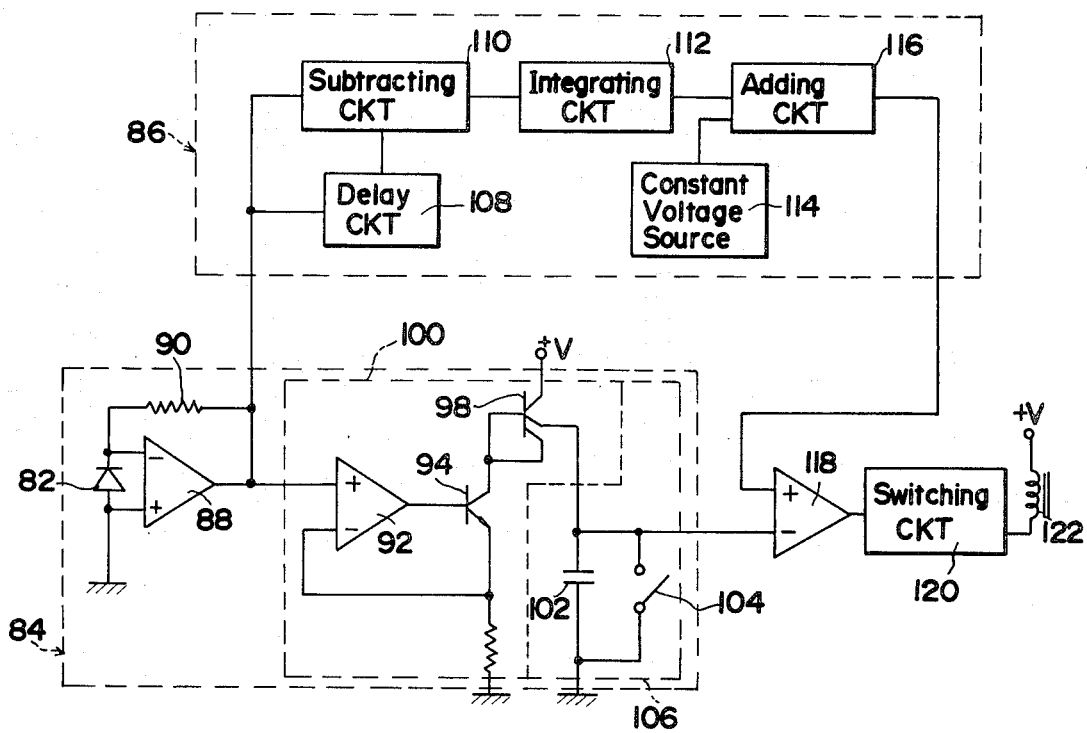
FIG. 11 is a circuit diagram showing another exposure control device of the present invention.

FIG. 11 shows a circuit diagram of a second embodiment of the present invention, wherein the negative feedback circuit of differential amplifier 88 consists of resistor 90 such that the output of photodiode 82, which is not logarithmically compressed, is applied to light measuring and integrating circuit 84 and reference voltage circuit 86. Therefore, no logarithmic expansion is required within light measuring and integrating circuit 84, which is provided with voltage-current converter 100 consisting of differential amplifier 92, transistor 94 and mirror circuit 98, and integrating circuit 106 consisting of integrating capacitor 102 and trigger switch 104. Trigger switch 104 is closed upon completion of shutter cocking and is opened when leading shutter curtain 8 starts traveling.

Reference voltage circuit 86 includes delay circuit 108 for delaying the output from operational amplifier 88 of light measuring and integrating circuit 84 for a predetermined period of time; subtracting circuit 110 for subtracting the output of delay circuit 108 from the output of operational amplifier 88; integrating circuit 112 for integrating the output of subtracting circuit 110; adjustable constant-voltage power source 114 for generating a voltage commensurate with the sensitivity of a film loaded into the camera; and adding circuit 116 for adding the corrected output voltage of integrating circuit 112 and the output voltage of adjustable constant-voltage power source 114. Delay circuit 108 has the same circuit arrangement as delay circuit 48 in the first embodiment.

The output voltage of light measuring and integrating circuit 84 is compared by comparator 118 with the reference voltage generated by reference voltage circuit 86. When the output voltage of light measuring integrating circuit 84 voltage reaches that reference voltage, comparator 118 generates a signal which causes switching circuit 120 to deactivate electromagnet 122, whereby trailing shutter curtain 9 starts traveling to terminate an exposure.

In the second embodiment, an exposure error is also corrected in accordance with the difference in reflecting power between the film surface and the leading shutter curtain surface, thereby ensuring a correct exposure at all times.

Figure 12:
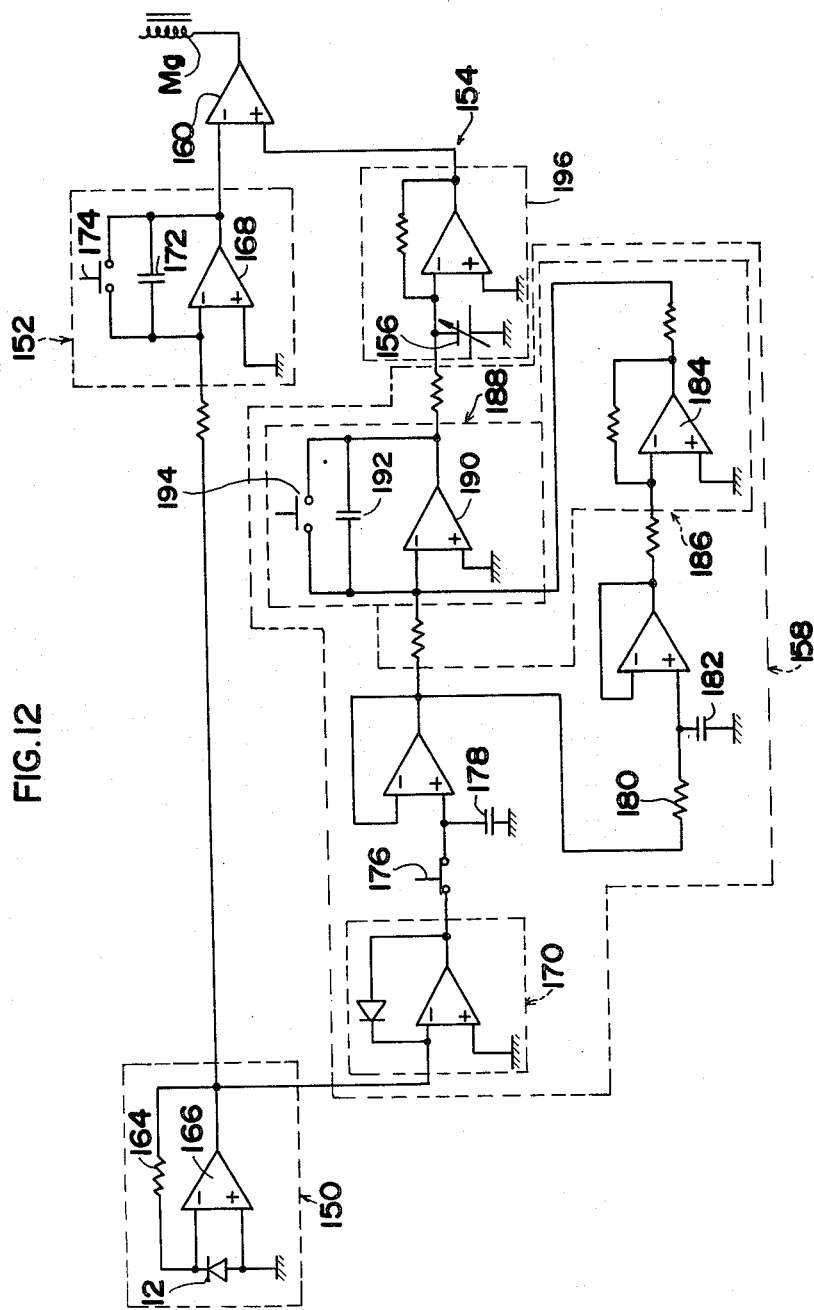
FIG. 12 is a circuit diagram of still another exposure control device of the present invention.

FIG. 12 shows a third embodiment according to the present invention wherein a delay circuit for delaying a light measurement output for a predetermined period of time is composed of a resistor and a capacitor. Light measuring circuit 150 includes photodiode 12 and integrating circuit 152. Reference voltage circuit 154 includes constant-voltage power source 156 and correcting circuit 158. Comparator 160 compares the output of integrating circuit 152 with that of reference voltage circuit 154. When the output voltage of integrating circuit 152 reaches the output voltage of reference voltage circuit 154, the output voltage of comparator 160 becomes a low level, causing electromagnet Mg to be energized so that the trailing shutter curtain is allowed to travel.

Light measuring circuit 150 is provided with operational amplifier 166. Photodiode 12 is connected across the input terminals of operational amplifier 166 and resistor 164 is connected between the output terminal and negative input terminal thereof. The output terminal of operational amplifier 166 is connected to the negative input terminal of differential amplifier 168 in integrating circuit 152 and also to logarithmically compressing circuit 170 inside compensating circuit 158. Integrating circuit 152 includes differential amplifier 168 and integrating capacitor 172 and trigger switch 174, thereby making it possible to integrate the output of light measuring circuit 150. Trigger switch 174 is closed upon completion of shutter cocking and is opened when leading shutter curtain 8 starts traveling. The output terminal of integrating circuit 152 is connected to the negative input terminal of comparator 160.

Correcting circuit 158 includes logarithmic compressing circuit 170, switch 176, capacitor 178, a delay circuit provided with resistor 180 and capacitor 182, subtracting circuit 186 provided with inverter 184, and integrating circuit 188. Switch 176 is closed upon completion of shutter cocking and is opened when leading shutter curtain 8 starts traveling. Integrating circuit 188 includes differential amplifier 190, integrating capacitor 192 and switch 194. Switch 194 is closed upon completion of shutter cocking and is opened when leading shutter curtain 8 starts traveling. The input terminal of adding circuit 196 is connected to the output terminal of adjustable constant-voltage power source 156 and the output terminal of correcting circuit 158. The output terminal of adding circuit 196 is connected to the positive input terminal of comparator 160.

The light measurement output of light measuring circuit 150 starts charging integrating capacitor 172 of integrating circuit 152 when the leading shutter curtain starts traveling. The light measurement output is logarithmically compressed by logarithmic compressing circuit 170 and is applied directly to an input terminal of subtracting circuit 186, and to another input terminal of subtracting circuit 186 after being delayed by resistor 180 and capacitor 182, e.g., for 1/100 second. Subtracting circuit 186 provides a difference between the two inputs. Integrating circuit 188 integrates the output of subtracting circuit 186. Adding circuit 196 generates a reference voltage corresponding to the sum of the output of integrating circuit 188 and the output voltage of adjustable constant-voltage power source 156.

The output voltage of integrating circuit 152 is compared by comparator 160 with the reference voltage. When the output voltage of integrating circuit 152 reaches the reference voltage, switching circuit 162 is actuated to deactivate electromagnet Mg, whereby the trailing shutter curtain starts traveling to terminate an exposure.

It should be noted that capacitor 178 and switch 176 constitute a storage circuit, and switch 176 is opened after the leading shutter curtain has completed traveling, thereby preventing the output of light measuring circuit 150 from being input to the capacitor of the storage circuit. Accordingly, the output voltage from the storage circuit becomes constant, so that the output voltage of the subtracting circuit 186 vanishes. As a result, even when the scene brightness varies after completion of travel of the leading shutter curtain, the reference voltage is prevented from varying in response to the change in the scene brightness.

It should be understood that a leading shutter curtain is generally accelerated during traveling, resulting in a faster speed at the end of traveling than at the start thereof. Thus, a leading shutter curtain of an actual shutter is delayed at various points during traveling relative to that of an imaginary shutter which always travels at a uniform speed, and overtakes the leading shutter curtain of the imaginary shutter at the end of the travel thereof. This means that the leading shutter curtain of an actual shutter covers a larger area in the exposure aperture during traveling than that of the imaginary shutter which travels at a uniform speed. As a result, exposure error due to the difference in reflecting power between the surfaces of a film and a leading shutter curtain in fact becomes small with an actual shutter, requiring a small amount of correction.

Additionally, the trailing shutter curtain usually takes time before it begins to actually cover the exposure aperture after it has started traveling. Therefore, for example, in the first embodiment, it is necessary to have switching circuit 30 generate a trailing shutter curtain travel starting signal earlier than the actual start of travel of the trailing shutter curtain so that the trailing shutter curtain starts to cover the exposure aperture at the correct time. This means that for control of a relatively short exposure time, the trailing shutter curtain travel starting signal is generated with a wider area of the exposure aperture still covered by the leading shutter curtain. As a result, the longer the period from the time when the trailing shutter curtain starts traveling to the time when it actually starts to cover the exposure aperture, the less the exposure error becomes, thereby allowing the amount of correction required therefor to be reduced.

Figure 13:
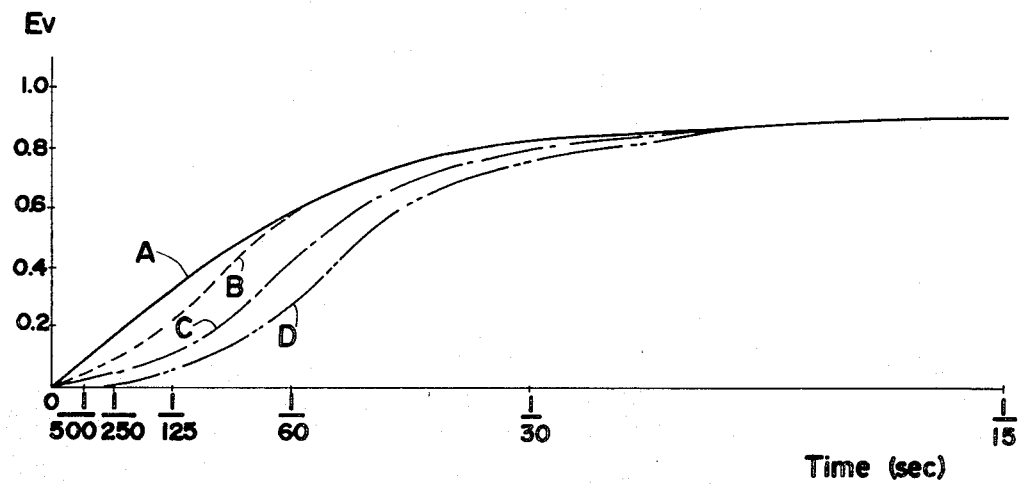
FIG. 13 shows variations in the reference value under various conditions.

With reference to FIG. 13, the abscissa represents the time from the start of travel of the leading shutter curtain, and the ordinate represents the amount of the exposure correction with the assumption that the light reflected from the film surface is brighter by 1 EV than that reflected from the leading shutter curtain surface in terms of the value in the Additive System of Photographic Exposure. Line A represents the correction amount when the leading shutter curtain travels from one end of the exposure aperture to the other in 1/60 second at a uniform speed, while the trailing shutter curtain begins to cover the exposure aperture immediately after a trailing shutter curtain travel starting signal has been generated. Line B represents the correction amount when the light measuring system alone is changed from the case of line A to the center-weighted light measuring system. In this case, the reflecting power of the film surface is less affected than that of line A until the leading shutter curtain reaches the center of the exposure aperture, whereby the correction amount is small. The reflecting power of the film surface is more affected thereafter than that of line A, thereby necessitating that the correction amount be increased. Line B coincides with line A at 1/60 second after the leading shutter curtain has started traveling.

Line C represents the correction amount with the condition that the leading shutter curtain is accelerated and added to the case of line B. In this case, the correction amount is reduced due to the above mentioned reasons. Finally, line D represents the correction amount where a further condition that a predetermined period of time is required before the trailing shutter curtain actually begins to cover the exposure aperture after generation of a trailing shutter curtain travel starting signal is added to the case of line C, whereby the correction amount is further reduced.

In the embodiments, the delay time provided by the delay circuits may be 0.5 to 2 times the duration required for the shutter curtain to travel from one end of the exposure aperture to the other.

What is claimed is:

1. An exposure control device for a camera comprising:
    shutter means including leading and trailing shutter members located at the focal plane of the camera objective to be actuated for exposing film to scene light;
    a light measuring circuit including a light receiving means arranged to measure the scene light reflected from the surfaces of said leading shutter and/or the film, said light measuring circuit producing a light measurement signal as a function of the intensity of the light received by the light receiving means;
    first integration means for integrating said light measurement signal;
    delay means for generating an output corresponding to said light measurement signal after a predetermined delay of time;
    subtracting means for generating a difference signal by subtracting the output of said delay means from said light measurement signal;
    second integration means for integrating said difference signal;
    means for generating a constant first reference signal of a given level;
    comparison means for detecting the relationship between the three signals from said first and second integration means and said constant level means, and generating a control signal when said three signals reach a given relationship; and
    electromagnetic means for actuating said trailing shutter in response to said control signal.

2. An exposure control device as claimed in claim 1 wherein said detecting means includes an adding circuit for producing a second reference signal by the addition of the output of said second integration means to said first reference signal; and
    comparison means for generating said control signal when the output of said first integration means reaches a given relationship with respect to said second reference signal.

3. An exposure control device as claimed in claim 1, wherein said delay means includes a pulse generator for generating a series of clock pulses; and
    a bucket brigade device actuated by said clock pulses for delaying said measurement signal for a given period of time.

4. An exposure control device as claimed in claim 1, wherein said delaying means includes a resistor and a capacitor serially connected to said resistor.

5. An exposure control device as claimed in claim 1, wherein said light measuring circuit includes an operational amplifier having positive and negative input terminals, said light receiving means being connected between said input terminals; and
    a feedback circuit coupled between the output and the negative input terminals of said operational amplifier.

6. An exposure control device as claimed in claim 4, wherein said feedback circuit includes a diode.

7. An exposure control device as claimed in claim 4, wherein said feedback circuit includes a resistor.

* * * * *